(12) United States Patent
Cleaveland et al.

(10) Patent No.: US 6,385,765 B1
(45) Date of Patent: May 7, 2002

(54) SPECIFICATION AND VERIFICATION FOR CONCURRENT SYSTEMS WITH GRAPHICAL AND TEXTUAL EDITORS

(75) Inventors: Rance Cleaveland, Durham, NC (US); Scott A. Smolka, Port Jefferson, NY (US); Philip M. Lewis, Stony Brook, NY (US); Y. S. Ramakrishna, Port Jefferson, NY (US)

(73) Assignee: The Research Foundation, Stony Brook, NY (US)

( * ) Notice: Subject to any disclaimer, the term of this patent is extended or adjusted under 35 U.S.C. 154(b) by 0 days.

(21) Appl. No.: 08/887,147

(22) Filed: Jul. 2, 1997

Related U.S. Application Data

(60) Provisional application No. 60/021,094, filed on Jul. 2, 1996.

(51) Int. Cl.[7] .................................................. G06F 9/44
(52) U.S. Cl. .................................... 717/8; 717/5; 717/7
(58) Field of Search ................................. 395/701, 500, 395/183.09; 371/27.4; 706/920; 717/1, 9, 8, 5, 7

(56) References Cited

PUBLICATIONS

Forte Software Version 1.0 System Management Guide SYS, Jun. 30, 1994.*
Forte Software Version 1.0 Workshops WORK, Jun. 30, 1994.*
Forte Software Version 1.0 Tool Reference Manual TOOL, Jun. 30, 1994.*
Forte Software Version 1.0 Framework FRAME, Jun. 30, 1994.*
The Concurrency Factory Homepage http://www.cs.sunysb.edu/μconcurr/, Mar. 24, 1999.*
The Concurrency Factory Software Development Environment Rance Cleaveland et al, 1994.*
Compilers Principles Techniques and Tools, Aho et al. Chapters 1–6, 10, Sep. 1985.*
Meije Concurrenly, Synchronization and Real Time http://www.inrig.fr/Equipes/ME IJFeng.html, Dec. 1999.*
Formal Methods Fact File VDM and Z, Harry Andrew, Wiley press, pp. 281–291, Sep. 19, 1996.*
Gupta, R., et al., "On Randomization in Sequential and Distributed Algorithms", ACM Computing Surveys, vol. 26, No. 1, pp. 7–86 (Mar. 1994).
Dong, Y. et al., "Fighting Livelock in the I=Protocol: A Comparative Study of Verification Tools" Proceedings of the Fifth International Conference on Tools and Algorithms for the Construction and Analysis of Systems (TACAS '99), Lecture Notes in Computer Science, Springer–Verlag (Apr. 1999).
Cleaveland, R. et al., "A Semantics–Based Verification Tool for Finite–State Systems" Proceedings of the IFIP Symposium on Protocol Specification, Testing and Verification, pp. 287–302, Enschede, the Netherlands (Jun. 1989).
Cleaveland, R. et al., "The Concurrency Workbench" Automatic Verification Methods for Finite State Systems (CAV '89), vol. 407, Lecture Notes in Computer Science, pp. 24–37, Grenoble France, Springer–Verlag (Jun. 1989).

(List continued on next page.)

Primary Examiner—Mark R. Powell
Assistant Examiner—Todd Ingberg
(74) Attorney, Agent, or Firm—Scully, Scott, Murphy & Presser

(57) ABSTRACT

Software for, and a method of using a computer for, specifying and verifying synchronous and asynchronous concurrent systems. The method comprises specifying software in a design language possessing a formal semantics; simulating the design in accordance with its formal semantics; verifying that the design satisfies predetermined requirements; generating test cases and; generating software code. The method includes the steps of inputting by a graphical editor and a textual editor a formal design of the software, inputting desired properties as formulas in temporal logic, and verifying automatically if the formal design satisfies the desired properties.

63 Claims, 6 Drawing Sheets

PUBLICATIONS

Cleaveland, R. and M. Hennessy, "Testing Equivalence as a Bisimulation Equivalence" Automatic Verification Methods for Finite State Systems (CAV '89), vol. 407, Lecture Notes in Computer Science, pp. 11–23, Grenoble, France, Springer–Verlag (Jun. 1989).

Cleaveland, R., "Tableau–based Model Checking in the Propositional Mu–Calculus" Acta Informatica, 27(8):725–747 (Sep. 1990).

Cleaveland, R., "On Automatically Explaining Bisimulation Inequivalence" Computer–Aided Verification (CAV'90), vol. 531 of Lecture Notes in Computer Science, pp. 364–372, Piscataway, NJ, Springer–Verlag (Jun. 1990).

Cleaveland, R. and M. Hennessey, "Priorities in Process Algebras" Information and Computation, 87 (1/2), pp. 58–77 (Jul./Aug. 1990).

Cleaveland, R. and B. Steffen, "A Preorder for Partial Specifications" CONCUR '90, vol. 458 of Lecture Notes in Computer Science, pp.141–151, Amsterdam, Springer–Verlag (Aug. 1990).

Cleaveland, R. and B. Steffen, "Computing Behavioural Relations, Logically" Automata, Languages and Programming (ICALP '91), vol. 510 of Lecture Notes in Computer Science, pp. 127–138, Madrid, Springer–Verlag (Jul. 1991).

Cleaveland, R. and B. Steffen, "A Linear–Time Model–Checking Algorithm for the Alternation–Free Modal Mu–Calculus", Computer–Aided Verification (CAV '91), vol. 575 of Lecture Notes in Computer Science, pp. 48–58, Aalborg, Denmark, Springer–Verlag (Jul. 1991).

Cleaveland, R. and A. Zwarico, "A Theory of Testing for Real–Time" Sixth Annual Symposium on Logic in Computer Sciences (LICS '91) pp. 110–119, Amsterdam (Jul. 1991).

Celikkan, U. and R. Cleaveland, "Computing Diagnostic Tests for Incorrect Processes" Proceedings of the IFIP Symposium on Protocol Specification, Testing and Verification, pp. 263–278, Lake Buena Vista, Florida (Jun. 1992).

Celikkan, U. and R. Cleaveland, "Generating Diagnostic Information for Behavioral Preorders" Distributed Computing, vol. 9, pp. 61–75 (1995).

Cleaveland, R. and B. Steffen, "Faster Model Checking for the Modal Mu–Calculus" Computer–Aided Verification (CAV '92), vol. 663 of Lecture Notes in Computer Science, pp. 410–422, Springer–Verlag (Jun./Jul. 1992).

Cleaveland, R. et al., "Testing Preorders for Probabilistic Processes" Automata, Languages and Programming (ICALP '92) vol. 623 of Lecture Notes in Computer Science, pp. 708–719, Vienna (Jul. 1992).

Cleaveland, R. "Analyzing Concurrent Systems Using the Concurrency Workbench" Functional Programming, Concurrency, Simulation and Automated Reasoning, vol. 693 of Lecture Notes in Computer Science, pp. 129–144 (1993).

Cleaveland, R. "An Operational Semantics of Value Passing" Proceedings of the North American Process Algebra Workshop, Cornell University Technical Report TR 93–1369, Ithaca, New York (Aug. 1993).

Cleaveland, R. and M. Hennessey, "Testing Equivalence as a Bisimulation Equivalence" Formal Aspects of Computing, vol. 5, pp. 1–20 (1993).

Cleaveland, R. et al., "The Concurrency Workbench: A Semantics Based Tool for the Verification of Concurrent Systems" ACM Transactions on Programming Languages and Systems, vol. 15, No. 1, pp. 36–72 (Jan. 1993).

Cleaveland, R. and B. Steffen, "A Linear–Time Model–Checking Algorithm for the Alternation–Free modal Mu–Calculus" Formal Methods in System Design, vol. 2, pp.121–147 (1993).

Cleaveland, R. and D. Yankelevich, "An Operational Framework for Value–Passing Processes" 21st Annual ACM SIGPLAN–SIGACT Symposium on Principles of Programming Languages (POPL '94), pp. 326–338 (Jan. 1994).

Elseaidy, W. et al., "Verifying an Intelligent Structural Control System: A Case Study" Proceeding of the Real–Time Systems Symposium, pp. 271–275 (Dec. 1994).

Natarajan, V. et al., "Priority and Abstraction in Process Algebra" Foundations of Software Technology and Theoretical Computer Science, vol. 880 of Lecture Notes in Computer Science, pp. 217–230 (Dec. 1994).

Yuen, S. et al., "Fully Abstract Characterizations of Testing Preorders for Probabilistic Processes" CONCUR '94, vol. 836 of Lecture Notes in Computer Science, pp. 497–512 (Aug. 1994).

Bhat, G. et al., "Efficient On–the–Fly Model Checking for CTL" Tenth Annual Symposium on Logic in Computer Science (LICS '95), pp. 388–397 (Jun. 1995).

Cleaveland, R. et al., "Optimality in Abstractions of Model Checking" Static Analysis, vol. 983 of Lecture Notes in Computer Science, pp. 51–63 (Sep. 1995).

Natarajan, V. and R. Cleaveland, "Divergence and Fair Testing" Automata, Languages and Programming (ICALP '95), vol. 944 of Lecture Notes in Computer Science, pp. 648–659 (Jul. 1995).

Bhat, G. and R. Cleaveland, "Efficient Local Model–Checking for Fragments of the Modal Mu–Calculus" Tools and Algorithms for the Construction and Analysis of Systems (TACAS '96), vol. 1055 of Lecture Notes in Computer Science, pp. 107–125 (Mar. 1996).

Bhat, G. and R. Cleaveland, "Efficient Model Checking via the Equational Mu–Calculus" Eleventh Annual Symposium on Logic in Computer Science (LICS '96), pp. 304–312 (Jul. 1996).

Cleaveland, R. et al., "A Theory of Testing for Soft Real–Time Processes" Eighth International Conference on Software Engineering and Knowledge Engineering (SEKE '96) pp. 474–479 (Jun. 1996).

Cleaveland, R. et al., "The Concurrency Factory Software Development Environment" Tools and Algorithms for the Construction and Analysis of Systems (TACAS '96), vol. 1055 of Lecture notes in Computer Science, pp. 391–395 (Mar. 1996).

Cleaveland, R. et al., "The Concurrency Factory: A Development Environment for Concurrent Systems" Computer–Aided Verification (CAV '96), vol. 1102 of Lecture Notes in Computer Science, pp. 398–401 (Jul. 1996).

Cleaveland, R. et al., "A Process Algebra with Distributed Priorities" CONCUR '96, vol. 1119 of Lecture Notes in Computer Science, pp. 34–49 (Aug. 1996).

Cleaveland, R. et al., "Priorities for Modeling and Verifying Distributed Systems" Tools and Algorithms for the Construction and Analysis of Systems (TACAS '96), vol. 1055 of Lecture Notes in Computer Science, pp. 278–297 (Mar. 1996).

Cleaveland, R. et al., "Modeling and Verifying Distributed Systems Using Priorities: A Case Study" Software Concepts and Tools, vol. 17, pp. 50–62 (1996).

Cleaveland, R. and S. Sims, "The NCSU Concurrency Workbench" Computer–Aided Verification (CAV'96), vol. 1102 of Lecture Notes in Computer Science, pp. 394–397 (Jul. 1996).

Elseaidy, W. et al., "Formal Timing Analysis for Fault–Tolerant Active Structural Control Systems" Proceedings of the First Workshop on Formal Methods in System Practice (Jan. 1996).

Natarajan, V. and R. Cleaveland, "An Algebraic Theory of Process Efficiency" Eleventh Annual Symposium on Logic in Computer Science (LICS '96), pp. 63–72 (Jul. 1996).

Natarajan, V. and R. Cleaveland, "Predictability of Real–Time Systems: A Process–Algebraic Approach" Real–Time Systems Symposium, pp. 82–91 (Dec. 1996).

Elseaidy, W. et al., "Modeling and Verifying Active Structural Control Systems" Science of Computer Programming, vol. 29, pp. 99–122 (Jul. 1997).

Cleaveland, R. and S. Sims, "Generic Tools for Verifying Concurrent Systems" Second International Workshop on Applied Formal Methods in System Design, pp. 3–8 (Jun. 1997).

Cleaveland, R. et al., "An Algebraic Theory of Multiple Clocks" CONCUR '97, vol. 1243 of Lecture Notes in Computer Science, pp. 166–180 (Jul. 1997).

Bhat, G. and R. Cleaveland, "Dynamic Priorities for Modeling Real–Time" Formal Description Techniques and Protocol Specification, Testing and Verification, pp. 321–336 (Nov. 1997).

Cleaveland, R. et al., "A Process Algebra with Distributed Priorities" Theoretical Computer Science, vol. 195, No. 2, pp. 227–258 (Mar. 1998).

Bernardo, M. et al., "Two Towers: A Tool Integrating Functional and Performance Analysis of Concurrent Systems" Formal Description Techniques and Protocol Specification, Testing and Verification, pp. 457–467 (Nov. 1998).

Philippou, A. et al., "Probabilistic Resource Failure in Real–Time Process Algebra" CONCUR '98, vol. 1466 of Lecture Notes in Computer Science, pp. 389–404 (Sep. 1998).

Kumar, K.N. et al., "Infinite Probabilistic and Nonprobabilistic Testing" Foundations of Software Technology and Theoretical Computer Science, vol. 1530 of Lecture Notes in Computer Science, pp. 209–220 (Dec. 1998).

Bhat, G. et al., "A Practical Approach to Implementing Real–Time Semantics" Annals of Software Engineering, vol. 7, pp. 127–155 (1999).

Cleaveland, R. and Smolka, S.A., "Process Algebra" Encyclopedia of Electrical Engineering, John Wiley & Sons (1999).

Narasimha, M. et al., "Probabilistic Temporal Logics via the Modal Mu–Calculus" Foundations of Software Science and Computation Structures, vol. 1578 of Lecture Notes in Computer Science, pp. 288–305 (Mar. 1999).

Müller–Olm, M. et al., "On the Evolution of Reactive Components: A Process–Algrbraic Approach" Fundamental Approaches to Software Engineering, vol. 1577 of Lecture Notes in Computer Science, pp. 161–175 (Mar. 1999).

Cleaveland, R. "Pragmatics of Model Checking: An STTT Special Section" Software Tools for Technology Transfer, vol. 2, No. 3, pp. 208–218 (Nov. 1999).

Du, X. "Local Model Checking and Protocol Analysis" Software Tools for Technology Transfer, vol. 2, No. 3, pp. 219–241 (Nov. 1999).

Cleaveland, R. et al., "Testing Preorders for Probabilistic Processes" Information and Computation, vol. 154, No. 2, pp. 93–148 (Nov. 1999).

Cleaveland, R. and S. Sims, "Generic Tools for Verifying Concurrent Systems" Science of Computer Programming (1999).

Bernardo, Marco and R. Cleaveland, "A Theory of Testing for Markovian Process" CONCUR 2000, vol. 1877 of Lecture Notes in Computer Science, pp. 305–319 (Aug. 2000).

Cleaveland, R. et al., "GCCS: A Graphical Coordination Language for System Specification" Coordination 2000, vol. 1906 of Lecture Notes in Computer Science, pp. 284–298 (Sep. 2000).

Cleaveland, R. and S. Purushothaman Iyer, "Branching–Time Probabilistic Model Checking" ICALP Workshops 2000, vol. 8 of Proceedings in Informatics, pp. 487–500 (Jul. 2000).

Cleaveland, R. and Lüttgen, G. "A Semantic Theory for Heterogeneous System Design" Foundations of Software Technology and Theoretical Computer Science, vol. 1974 of Lecture Notes in Computer Science, pp. 312–324 (Dec. 2000).

Lüttgen, G. et al., "A Compositional Approach to Statecharts Semantics" Eighth International Symposium on Foundations of Software Engineering, pp. 120–129 (Nov. 2000).

Cleaveland, R. and J. Reily, "Testing–Based Abstraction for Value–Passing Systems" CONCUR '94, vol. 836 of Lecture Notes in Computer Science, pp. 417–432 (Aug. 1994).

Cleaveland, R. and S.A. Smolka, "Strategic Directions in Computing Research Concurrency Working Group Report" ACM Computing Surveys, vol. 28, No. 4. pp. 607–625 (Dec. 1996).

Du, X. et al., "Software Design, Specification, and Verification: Lessons Learned from the Rether Case Study" Proceedings of the Sixth International Conference on Algebraic Methodology and Software Technology (AMAST '97), Lecture Notes in Computer Science (Dec. 1997).

Baeten, J.C.M. et al., "Axiomatizing Probabilistic Processes: ACP with Generative Probabilities" Information and Computation, vol. 121, No. 2, pp. 234–255 (Sep. 1995).

Moller, F. and S.A. Smolka, "On the Computational Complexity of Bisimulation" ACM Computing Surveys, vol. 27, No. 2, pp. 287–289 (Jun. 1995).

Sokolsky, O. and S.A. Smolka, "Local Model Checking for Real–Time Systems" Computer–Aided Verification '95, American mathematical Society (Jul. 1995).

Cleaveland, R. et al., "The Concurrency Factory: A Development Environment for Concurrent Systems" Computer–Aided Verification, vol. 1102 of Lecture Notes in Computer Science, pp. 398–401 (Jul. 1996).

Ramakrishna, Y.S. et al., "Efficient Model Checking Using Tabled Resolution" Proceedings of the Ninth International Conference on Computer–Aided Verification, vol. 1243 of Lecture Notes in Computer Science (Jul. 1997).

Uselton, A. and S.A. Smolka, "A Compositional Semantics for Statecharts using Labeled Transition Systems" Proceedings of the Fifth International Conference on Concurrency Theory, Lecture Notes in Computer Science (Aug. 1994).

Ramakrishna, Y.S. and S.A. Smolka, "Partial–Order Reduction in the Weak Modal Mu–Calculus" Proceedings of the Eighth International Conference on Concurrency Theory, Lecture Notes in Computer Science (Jul. 1997).

Basu, S. et al., "Model Checking the Java Meta–Locking Algorithm" Proceedings of the Seventh IEEE International Conference and Workshop on the Engineering of Computer Based Systems (Apr. 2000).

Kumar, K.N. et al., "Infinite Probabilistic and Nonprobabilistic Testing" Proceedings of the 18th Conference on the Foundations of Software Technology and Theoretical Computer Science, Lecture notes in Computer Science (Dec. 1998).

van Glabbeek, R.J., et al., "Reactive, Generative and Stratified Models of Probabilistic Processes" Information and Computation, vol. 121, No. 1, pp. 59–80 (Aug. 1995).

Liu, X. and S.A. Smolka, "Simple Linear–Time Algorithms for Minimal Fixed Points" Proceedings of the 26th International Conference on Automata, Languages, and Programming, Lecture Notes in Computer Science (Jul. 1998).

Joung, Y.–J. and S.A. Smolka, "Strong Interaction Fairness via Randomization" IEEE Trans. on Parallel and Distributed Systems, vol. 9, No. 2 (Feb. 1998).

Joung, Y.–J. and S.A. Smolka, "A Comprehensive Study of the Complexity of Multiparty Interaction" Journal of the ACM, vol. 43, No. 1, pp. 75–115 (Jan. 1996).

Zhang, S. et al., "On the Parallel of Model Checking in the Modal Mu–Calculus" Proceedings of the Ninth Annual IEEE Symposium on Logic in Computer Science, pp. 154–163 (Jul. 1994).

Stark, E.W. and S.A. Smolka "Compositional Analysis of Expected Delays in Networks of Probabilistic I/O Automata" Proceedings of the 13th Annual IEEE Symposium on Logic in Computer Science (Jun. 1998).

Lu, S. and S.A. Smolka, "Model Checking the Secure Electronic Transaction (SET) Protocol" Proceedings of the Seventh International Symposium on Modeling, Analysis and Simulation of Computer and Telecommunication Systems (Oct. 1999).

E.W. Stark and S.A. Smolka, "A Complete Axiom System for Finite–State Probabilistic Processes" Proof, Language and Interaction: Essays in Honour of Robin Milner (1999).

Philippou, A. et al., "Probabilistic Resource Failure in Real–Time Process Algebra" Proceedings of the Ninth International Conference on Concurrency Theory, Lecture Notes in Computer Science (Aug. 1998).

Celikkan, U. and R. Cleaveland, "Generating Diagnostic Information for Behavioral Preorders" Distributed Computing, vol. 6, pp. 61–75 (1995).

Moller, F. and S.A. Smolka, "On the Computational Complexity of Bisimulation" ACM Computing Surveys, vol. 27, No. 2, pp. 287–289 (Jun. 1995).

Liu, S. et al., "Fully Local and Efficient Evaluation of Alternating Fixed Points" Proceedings of the Fourth International Conference on Tools and Algorithms for the Construction and Analysis of Systems (TACAS '98), Lecture Notes in Computer Science, Springer–Verlag (Apr. 1998).

Cleaveland, R. et al., "The Concurrency Factory Software Development Environment" In T. Margaria and B. Steffen, editors, Tools and Algorithms for the Construction and Analysis of Systems (TACAS '96), vol. 1055 of Lecture Notes in Computer Science, pp. 391–395, Passau, Germany, Springer–Verlag (Mar. 1996).

Du, X. et al., "Local Model Checking and Protocol Analysis" Software Tools for Technology Transfer, vol. 2, No. 3, pp. 219–241 (Nov. 1999).

Cleaveland, R. et al., "A theory of Testing for Soft Real–Time Processes" Proceedings of the Eighth International Conference on Software Engineering and Knowledge Engineering, Lake Tahoe, Nevada, pp. 474–479.Knowledge Systems Institute, Skokie Illinois, ISBN 0–9641699–3–2 (May 1996).

Du, X. et al., "Tabled Resolution + Constraints: A Recipe for a Model Checking Real–Time Systems" Proceedings of the 21st IEEE Real–Time Systems Symposium (RTSS~2000). Lecture Notes in Computer Science, Springer–Verlag (Nov. 2000).

Smolka, S.A. and B. Steffen, "Priority as Extreme Probability" Formal Aspects of Computing, vol. 8, pp. 585–606 (1996).

Smolka, S.A. et al., "Logic Programming and Model Checking" Proceedings of PLILP/ALP'98, Pisa, Italy. Lecture notes in Computer Science, vol. 1490, Springer–Verlag (Sep. 1998).

Roychoudhury, A. et al., "Tabulation –based Induction Proofs with Application to Automated Verification" Proceedings of the International Workshop on Tabulation in Parsing and Deduction (TAPD'98), Paris, France (Apr. 1998).

Wu, S.–H. et al., "Composition and Behaviors of Probabilistic I/O Automata" Theoretical Computer Science, vol. 176, No. 1–2, pp. 1–38 (1997).

Joung, Y. –J. and S.A. Smolka, "Coordinating First–Order Multiparty Interactions" ACM TOPLAS, vol. 16, No. 3, pp. 954–985 (May 1994).

Cleaveland, R. et al., "GCCS: A Graphical Coordination Language for System Specification" Proceedings of the Fourth International Conference on Coordination Models and Languages (Coordination 2000). Lecture Notes in Computer Science, Springer–Verlag (Sep. 2000).

Cleaveland R. and P. Panangaden, "Type Theory and Concurrency" International Journal of Parallel Programming, 17(2):153–206 (1988).

De Nicola, R. and S.A. Smolka, "Concurrency: Theory and Practice" ACM Computing Services, vol. 28, No. 4es, Article 52 (Dec. 1996).

Cleaveland, R. et al., "The Concurrency Factory—Practical Tools for Specification, Simulation, Verification and Implementation of Concurrent Systems" Proceedings of DIMACS Workshop on Specification of Parallel Algorithms, American Mathematical Society, Princeton, NJ (May 1994).

Elseaidy, W.M. et al., "Modeling and Verifying Active Structural Control Systems" Science of Computer Programming, 29(1–2):99–122, Jul. 1997.

Lüttgen, G. et al., "Statecharts Via Process Algebra" CONCUR '99, vol. 1664 of Lecture Notes in Computer Science (Aug. 1999).

Cleaveland, R. "Semantic Theories and System Design" ACM Computing Surveys, vol. 28, No. 4es (Dec. 1996).

Cleaveland, R. "Formality and Software Design" ACM Computing Surveys, vol. 28, No 4es (Dec. 1996).

Fredette, A.N. and R. Cleaveland, "RTSL: A Language for Real–Time Schedulability Analysis" Proceedings of Real–Time Systems Symposium (Dec. 1993).

The Science of Programming, David Gries, second printing Part I propositions and predicates, 1981.*

Verisoft, Lucent Technologies http://www1.bell–labs.com/project/verisoft/papers.html, May 2000.*

Logic for Problem Solving, R. Kowalski Preface and Chapter 4, 1979.*

Z An Introduction to Formal Methods, second Edition A. Diller Chapters 4, 13, 18, 19, 1994.*

RAISE Frequently Asked Questions http://spd–web.terma.com/projects/RAISE/faq.html, May 2000.*

Object–oriented specification in LOTOS and Z or My cat Really is Object Oriented. E. Cusack, Jun. 1990.*

A Framework for using Formal Methods in object Oriented Software Development R. Holt, Apr. 1992.*

Formal Methods Fact File VDM and Z, A. Harry Chapter 8 Tool Support, Oct. 1996.*

Principles of Object Oriented Analysis and Design Chapters 1 and 20, 1992.*

* cited by examiner 0  procedure LMC (N:network with $[N]=\langle S,\rightarrow,\Lambda,s_0\rangle$, $X_0$ in $B$: $L\mu$ formula)
1      Initialize the DFS stack $D := \langle\langle s_0,X_0\rangle\rangle$;
2      Initialize the visited vertex table $VT := \{\langle s_0,X_0\rangle\}$;
3      Initialize the Tarjan stack to $TS := \langle\rangle$;
4      while $D$ is not empty do
5          let $\upsilon = \langle s, X\rangle$ be the top vertex in $D$;
6          if value($\upsilon$) $\in \{0,1\}$ then {
                   /* type($\upsilon$) = $\lambda$ or value known through back-propagation */
7              pop $D$;
8              transitively propagate $\upsilon$'s value backwards via its $U$-predecessors;
9          }
10         else { /*value($\upsilon$) = $U$ */
11             obtain the next successor $\upsilon'$ of $\upsilon$, using the rules in Table 1;
                   /* $\upsilon'$ is set to null if $\upsilon$ has no more successors */
12             if $\upsilon' = null$ then {
13                 pop $D$;
14                 push $\upsilon$ on $TS$;
15                 if $\upsilon$ is the root of an SCC $C$ then { /* ask Tarjan */
16                     pop the vertices in $TS$ that belong to $C$,
                            and run a global iterative algorithm (EL/CKS) on $C$;
                            /* the values of the vertices in $C$ are now determined */
17                     transitively propagate $\upsilon$'s value backwards via its $U$-predecessors;
18                 }
19             }
20             else if value($\upsilon'$) $\in \{0,1\}$ then { /* type($\upsilon'$) = $\lambda$ or $\upsilon'$ visited before */
21                 add $\upsilon'$ to $VT$;
22                 update value($\upsilon'$);
23             }
24             else if $\upsilon' \notin VT$ then { /* value($\upsilon'$) = $U$ and first visit of $\upsilon'$ */
25                 add $\upsilon'$ to $VT$;
26                 push $\upsilon'$ on $D$;
27             }
28         }
29     endwhile
30     return value($\langle s_0,X_0\rangle$);
31 end /* LMC */

FIG. 3

$$\Lambda: \frac{\langle s, X\rangle}{\langle s, X_1\rangle \; \langle s, X_2\rangle} \quad [X = X_1 \wedge X_2] \qquad V: \frac{\langle s, X\rangle}{\langle s, X_1\rangle \; \langle s, X_2\rangle} \quad [X = X_1 \vee X_2]$$

$$\Lambda: \frac{\langle s, X\rangle}{\langle s_1, Y\rangle \ldots \langle s_K, Y\rangle} \quad [X = [a]Y, \; s \xrightarrow{a} s_1, \ldots, s \xrightarrow{a} s_K]$$

$$V: \frac{\langle s, X\rangle}{\langle s_1, Y\rangle \ldots \langle s_K, Y\rangle} \quad [X = \langle a\rangle Y, \; s \xrightarrow{a} s_1, \ldots, s \xrightarrow{a} s_K]$$

FIG. 4

550 {
- replace line 0 of procedure *LMC* with the following:
0   procedure $LMC_{P0}$ (*N*: network with $[N] = \langle S, \rightarrow, \Lambda, s_0 \rangle$,
            $X_0$ in *B*: $L_\mu$ formula as outlined by translating
                an $L_\mu^\omega$ formula outlined in Section 4)

560 {
- replace line 11 of procedure *LMC* with the following:
11.1        $P := \text{prop}(X)$;
11.2        if type($\upsilon$) = $\iota$ then {
11.3            if $\exists T \in$ enabled (*s*) s.t. *T* is $P$-inert, $s \xrightarrow{T} s'$, and
                    either $\langle s', X \rangle \notin D$ or else
                    the induced loop has some non-inert transition then {
11.4            $\upsilon' := \langle s', X \rangle$;
11.5            make $\upsilon'$ a successor of $\upsilon$;
11.6            }
11.7            else set type($\upsilon$) according to Table 1;   /* type($\upsilon$)  $\iota$ now */
11.8        }
11.9        if type($\upsilon$)  $\iota$ then
11.10           obtain the next successor $\upsilon'$ of $\upsilon$, using the rules in Table 1;

FIG. 5

| FORMULA | PROGRAM | NO P.O. REDUCTION | | WITH P.O. REDUCTION | |
|---|---|---|---|---|---|
| | | VERTICES | MEMORY (MB) | VERTICES | MEMORY (MB) |
| DFS | leader2 | 36 | 0.057 | 24 | 0.049 |
| | leader3 | 134 | 0.189 | 62 | 0.098 |
| | leader4 | 633 | 1.106 | 272 | 0.361 |
| | leader5 | 2196 | 5.710 | 547 | 0.934 |
| LFP | leader2 | 128 | 0.082 | 39 | 0.049 |
| | leader3 | 478 | 0.344 | 82 | 0.115 |
| | leader4 | 2254 | 2.220 | 313 | 0.410 |
| | leader5 | 7748 | 11.665 | 577 | 0.965 |
| NST | leader2 | 108 | 0.057 | 49 | 0.049 |
| | leader3 | 402 | 0.213 | 122 | 0.139 |
| | leader4 | 1899 | 1.229 | 239 | 0.647 |
| | leader5 | 6588 | 6.177 | 1086 | 1.753 |
| DFS | sieve1 | 204 | 0.090 | 91 | 0.058 |
| | sieve2 | 699 | 0.352 | 117 | 0.107 |
| | sieve3 | 2481 | 1.646 | 134 | 0.131 |
| | sieve4 | 8481 | 7.741 | 149 | 0.155 |
| | sieve5 | 26868 | 33.571 | 162 | 0.189 |
| | sieve6 | 70645 | 115.237 | 173 | 0.213 |
| LFP | sieve1 | 362 | 0.107 | 93 | 0.058 |
| | sieve2 | 2597 | 0.721 | 122 | 0.107 |
| | sieve3 | 9109 | 3.473 | 139 | 0.131 |
| | sieve4 | 30753 | 16.286 | 154 | 0.163 |
| | sieve5 | 95885 | 70.091 | 167 | 0.189 |
| | sieve6 | 248811 | 238.100 | 178 | 0.221 |
| GFP | sieve1 | 612 | 0.115 | 95 | 0.058 |
| | sieve2 | 2097 | 0.451 | 126 | 0.107 |
| | sieve3 | 7443 | 1.966 | 143 | 0.131 |
| | sieve4 | 25443 | 8.839 | 158 | 0.155 |
| | sieve5 | 80604 | 37.462 | 171 | 0.189 |
| | sieve6 | 211935 | 125.452 | 182 | 0.221 |

FIG. 6

SPECIFICATION AND VERIFICATION FOR CONCURRENT SYSTEMS WITH GRAPHICAL AND TEXTUAL EDITORS

This application claims benefit of provisional application Ser. No. 60/021,094 filed Jul. 2, 1996.

The Federal Government of the United States may have certain rights to this patent under grants from the National Science Foundation (NSF CCR-9120995, NSF CCR-9505562, AFSR F49620-95-1-0508).

BACKGROUND OF THE INVENTION

1. Field of the Invention

This invention generally concerns methods for specifying and verifying systems having concurrently executing components and specifically concerns specification, simulation, verification, implementation and testing of concurrent and distributed systems.

2. Description of the Related Art

There are innumerable concurrent and distributed systems working and implemented each day throughout the world and, in some instances, beyond our world. Communication protocols, security protocols, embedded systems and process control systems are all examples of concurrent systems. These systems have become increasingly important to our personal lives and our society. Nearly every aspect of modern life is touched by a concurrent or distributed system multiple times each day. Our dependence on these systems makes their reliability critical. Therefore, their reliability should be insured.

There have been several industry and government studies done on the reliability and quality of commercially available software. These studies have consistently found software to be below accepted quality standards. The number of failures and "bugs" present in commercially available software is well above what is tolerated in other industries. The United States government and several software industry groups have begun efforts to implement quality control standards for commercial software. The greatest obstacle confronting these efforts is the lack of means to study, ascertain and correct errors within software designs and code.

Concomitantly, the design and implementation of concurrent and distributed systems have become increasingly more sophisticated and expensive. To insure these systems are being designed and implemented correctly and will perform in the manner intended without failure or error, certain computer aided software engineering (CASE) tools have been developed. CASE tools aim to ease and sometimes automate the process of software development.

Verification tools are a type of CASE tool that provide a means for verifying whether a planned or pre-existing system will satisfy its requirements. The use of CASE tools, and especially verification tools, can lead to the detection of errors early within the system development life cycle. The early detection of design errors will lead to money and time saved, increased quality and greater reliability and robustness of the final system.

Most existing verification tools have been designed to analyze synchronous hardware systems. Such tools, typically found in computer aided design (CAD) packages, are being routinely used in the hardware industry. However, asynchronous systems, possessing multiple independent threads of control, are becoming more prevalent. Software systems are typically asynchronous and the popularity of asynchronous hardware design is increasing. Thus, the need for verification tools for asynchronous systems is acute. This need is further accentuated since many functions originally performed in hardware are now being delegated to software systems.

Most verification tools today are severely limited in their ability to analyze these complex systems. One source of this limitation is known as the "state explosion" problem. A "state" in this context is a possible configuration the system can enter, or, alternatively, a snapshot of the system's execution.

State explosion occurs because, in general, the size of a system's state space grows exponentially in the size of the system's description. Therefore, the analysis of systems with relatively succinct descriptions can prove intractable for even the most powerful computers available.

To overcome state explosion, partial-order reduction techniques have been developed. Partial-order reduction is made possible since some system states, and the execution paths leading to these states are, in a formal sense, redundant. These redundancies can be safely ignored without compromising verification efforts. By avoiding these redundant states during analysis, the size of the state space to be searched may be dramatically reduced.

Another technique that has been developed for overcoming state explosion is local verification. Local verification is incremental, demand driven exploration of the state space, depending on the needs of the specific verification task at hand.

Model checking is a formal verification technique based on state exploration. Model checking allows one to check whether a state-machine representation of a system is a model of, or satisfies, a formula in temporal logic. Temporal logic allows for the specification of critical system properties such as freedom from deadlock and eventual service guarantees. Temporal logic formulas can be seen as mathematically precise system requirements.

The input to a model checker is a state-machine-based specification of the system to be verified and one or more system properties expressed in temporal logic. The output is either a declaration that the property is true or an identification of a portion of the state space falsifying the property.

There are several commercial and academic version model checkers available today. These use versions of temporal logic that restrict the class of logical properties that can be expressed.

SUMMARY OF THE INVENTION

Software designed to analyze and generate concurrent and distributed systems is herein disclosed. The invention's preferred embodiment comprises specification, simulation, verification, and code-generation capabilities.

For specification, the invention comprises graphical and textual editors. In the preferred embodiment, these allow one to render systems in GCCS and VPL. GCCS is a graphical coordination language for specifying hierarchically structured systems of communicating state machines. The GCCS network editor allows users to define the communication topology of their system in terms of nodes and communication links. Each node represents a system (network), and systems may be composed of sub-systems, sub-systems may be composed of sub-sub-systems, and so on. At the lowest level of a GCCS hierarchy are processes. The graphical process editor supports the creation of state machines. Users may also create networks and processes using VPL.

Two distinguishing aspects of GCCS and its realization via the network and process editors are: (1) GCCS has a formal "operational semantics" that allows GCCS-based specifications to be simulated and analyzed in mathematically precise ways; (2) GCCS is a true coordination language in the sense that any notation for processes with a suitable operational semantics could be used for defining processes.

VPL stands for "value passing language". It is a textual specification language used to define system components that exchange data values and that exhibit complex control structure. The invention contains a VPL editor that allows users to input VPL descriptions in a structure-based way. The VPL editor also performs static type checking to ensure that the right kinds of values are communicated in all contexts. Like GCCS, VPL is equipped with a formal operational semantics.

The graphical/textual combination is extremely useful in practice. In system design, some aspects (e.g. system architecture) are best captured graphically, while others (e.g. complex data and control structures) are easier to express textually. This improves the efficiency of system designers and maintainers.

Preferably, each editor comprises a structure-based editor and static type checker. The structure-based editor guarantees that one's input is syntactically correct. The static type checker insures that all data is used in a sound and complete manner.

The specification tools of this invention support open system specifications and support the analysis of subsystems independently of other subsystems. These tools can describe and analyze system components without specifying the entire system. These tools overcome what has been necessary, closed-world assumptions made by other specification tools. Since GCCS is able to combine systems or subsystems together into a unified whole regardless of the language used to describe the subsystems, it becomes the glue for assembling subsystems into systems. The specification element of the invention can therefore support hierarchically structured system designs which is the natural form for software to be composed.

The simulation element of the invention is based on the formal semantics of the specification languages. Simulation must always be faithful to the formal model which is insured in the invention. Since the invention is targeted at the analysis of hierarchical systems, it can simulate different levels of subsystems simultaneously.

The simulation element of the invention is a highly graphical and interactive system simulator, providing many forms of simulation output to the user. The simulator allows users to step through the execution of their designs one execution step at a time. They may also set break points and let the system run autonomously until a break point is reached. In this regard, the simulator functions like a traditional debugger from programming languages.

The simulator also supports replay, history lists, message sequence charts (MSCs) and reverse execution. History lists allow a user to restart a simulation at any point in the history of the simulation. MSCs provide a visually appealing depiction of process interactions, such as inter-process synchronizations and communications. Both graphical and textual specifications can be simulated in the manner just described.

The third element of the invention is the means for verification. This preferably includes model checking, equivalence checking, minimization and preorder checking. Model checking is used to decide if a system satisfies a temporal-logic formula. Equivalence checking is the process of determining whether two systems are equivalent to each other according to some mathematically defined notion of equivalence. Minimization refers to the process of reducing a system's state space by collapsing blocks of equivalent states into single states. Preorder checking is aimed at determining if one system refines or implements another system according to some mathematically defined refinement ordering. Collectively, these methods are a powerful machinery for manipulating and reasoning about formal system designs.

Computationally, a key aspect of the invention's model checking is that the entire procedure is fully automatic when the system to be analyzed is finite-state, i.e. the state space comprises a finite, albeit potentially large, number of system states. This is the case for many practical applications, such as embedded system or control software. When this is not the case, mathematically defined abstractions are applied to the system to render it finite. The advantage of an automatic verification technique is that the user need not interact with the model checker while it executes.

In one embodiment, the property specification language of the model checker is the modal mu calculus, a highly expressive temporal logic. Virtually every temporal logic used by existing model checkers can be reduced to the modal mu-calculus, meaning that the mu-calculus is more expressive than these logics. Besides being able to express standard system requirements such as deadlock freedom, the mu-calculus can describe subtle system correctness properties. One example of these correctness properties is possibility properties which are of the form: it is always possible to find an execution path along which a certain designated event occurs.

The model checker of the invention uses a new kind of partial-order reduction method to eliminate redundant portions of the state space from analysis. The technique is the first of its kind to be targeted for use with the modal mu-calculus. Like other partial-order methods, it uses an "independence check" to identify redundant system states and transitions. However, unlike previously proposed techniques, this partial-order method requires no information about the semantics of transitions. In particular, there is no need to associate transitions with source-level program operations, and no need to provide an independence relation among operations. Moreover, the notion of independence is a dynamic one and not, as in previous approaches, fixed in advance. Dynamic information regarding the behavior of the specification is used to determine independence.

The model checker is also local. That is, given a system S and a modal mu calculus formula f, the model checker explores only the portion of S's state space that is necessary to determine if S satisfies f. Experience has shown that this explored portion can be dramatically smaller than S's entire state space, and local model checking represents a very practical approach to verification.

The model checker supports the analysis of open systems, i.e., subsystems can be verified independently of one another. In contrast, other model checkers require that all system components be present before analysis can be carried out. The ability to handle open systems stems from the fact that the operational semantics used for the design languages is based on process algebra, a specification formalism for open systems. The ability to accommodate open systems allows for a much more flexible system design process.

The verification element also performs equivalence checking, the process of determining if two systems exhibit identical observable behavior. Equivalence checking can be used to check if a system design conforms to its high-level "service specification". For example, if the observable behavior of a communications protocol is identical to that of a perfect communication channel that delivers all messages in order, then it would be justifiable to deem the protocol correct.

Equivalence checking also provides the basis for performing state minimization. By collapsing blocks of equivalent system states into single states, one can obtain the smallest possible state space that still exhibits the same observable behavior as the original system. Like partial-order reduction, this technique is used to eliminate redundant and unnecessary portions of the state space from consideration during analysis. In combination with the invention's capability to handle open systems, minimization becomes even more potent. That is, system components can be added one at a time to the analysis, performing state minization each step of the way.

Lastly, the verification element of the invention performs preorder checking. Preorder checking determines whether one system is a refinement of another, or, in more practical terms, whether one system implements another. Preorder checking is used in a fashion analogous to equivalence checking but is more appropriate when one is dealing with system specifications given at different levels of abstraction.

The fourth element of the invention is its capability to generate executable code from system designs. The code generators relieve the user of the burden of having to manually recode their designs in the target language of the implemented system. They also eliminate the possibility of errors in the translation process. The generated code implements the state machines and the communication infrastructure. It also includes hooks for user-supplied code.

The code-generation element of the invention includes a novel solution to the "input/output guard scheduling problem". This is the problem of avoiding deadlocks that can arise when processes are allowed to choose nondeterministically to perform an input or output operation to a potential communication partner. The invention's solution is targeted toward hierarchically structured networks of processes and introduces a "communications scheduler" at each level of the hierarchy to properly arbitrate requests for input and output emanating from lower levels of the hierarchy. This solution is more efficient than a strictly centralized solution in which only a single, system-wide scheduler is deployed, and, at the same time, avoids delegating too much authority to individual processes (which could lead to deadlock).

The entire invention is based upon the existence of an underlying formal model of system behavior, namely, operational semantics. Operational semantics mathematically and unambiguously defines the step-by-step execution behavior of a system or subsystem, and all specifications rendered in the invention are equipped "for free" with such a semantics. The invention's model checker, equivalence checker, minimizer, preorder checker, and simulators, all rely on operational semantics to ensure that these activities are carried out faithfully; i.e., without the possibility of error due to the introduction of spurious system behaviors or the accidental elimination of actual system behaviors.

BRIEF DESCRIPTION OF THE DRAWINGS

FIG. 3 is the pseudo-code of the invention's Local Model Checker.

FIG. 4 depicts the rules for constructing the Dependency Graph.

FIG. 5 depicts modifications to the Local Model Checker to obtain partial-order reduction.

FIG. 6 depicts performance measurements of the partial-order reduction technique.

DETAILED DESCRIPTION OF THE DRAWINGS

Figure 1:
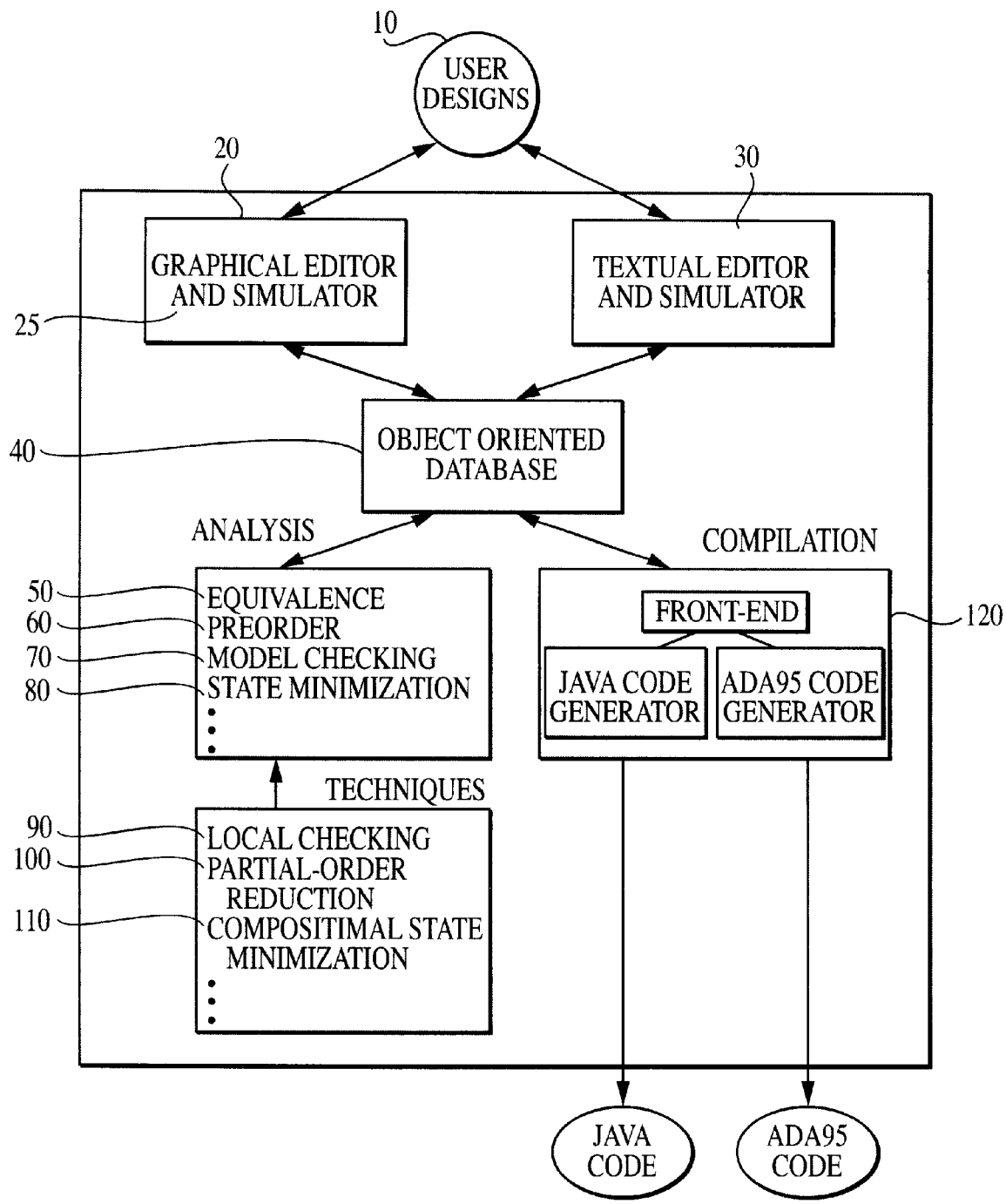
FIG. 1 depicts the architecture of the invention.

FIG. 1 depicts the overall architecture of the invention. Users input their system designs 10 into the invention using the graphical editor for the GCCS specification language 20 or the editor for the VPL textual specification language 30 or both. All designs are translated into an internal object-oriented representation 40 on which the rest of the invention operates. Designs may be simulated using the invention's graphical simulator 25 and they may be verified using the equivalence 50, preorder 60 and model checking 70 verification facilities of the invention. State minimization 80 may also be applied.

To combat the state explosion problem, the verification techniques of the invention apply several state-space management methods, such as local model checking 90, partial order reduction 100, and compositional state minimization 110. Verified designs may then be submitted to automatic code generation 120 from which executable concurrent/distributed code is generated.

Figure 2:
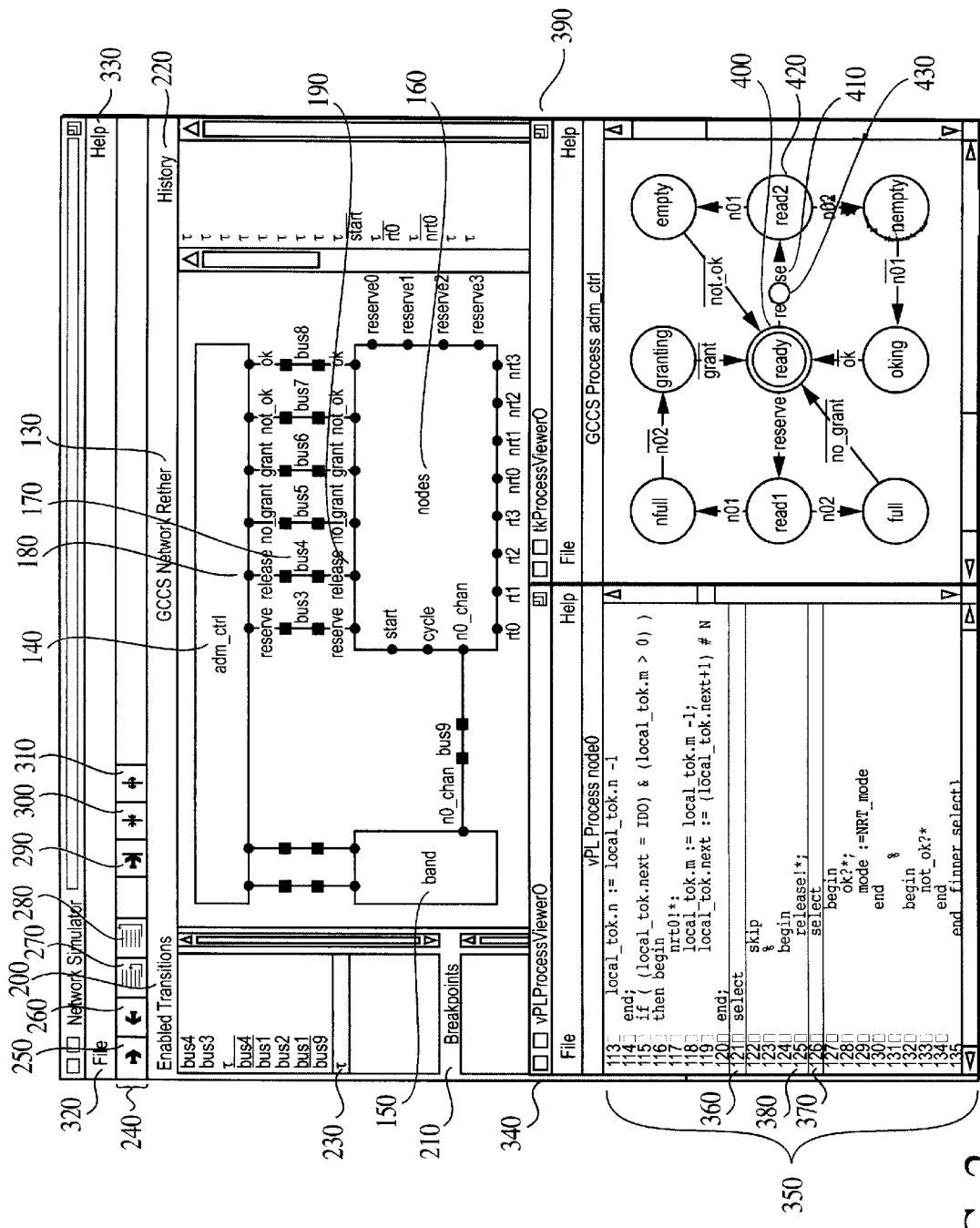
FIG. 2 is an illustration of the GCCS and the VPL specification languages and the graphical simulator.

FIG. 2 illustrates one embodiment of the invention's graphical and textual system design languages, as well as the invention's graphical simulator. The center panel 130 in the top half of the figure contains the GCCS network specification of the Rether protocol, a real time communications protocol for ethernet LANs. The Rether specification consists of three subsystems: admissions control 140, bandwidth monitoring 150 and the LAN nodes that execute the protocol 160 (four nodes in this example).

Communication pathways between subsystems are formed by connecting a port of one subsystem to a port of another subsystem using a bus. For example, the admissions control subsystem 140 communicates with the nodes subsystem 160 via bus4 170, which links the release port of admissions control 180 with the release port of nodes 190.

The other panels in the top half of FIG. 2 represent some of the simulation facilities available in the invention, including a list of enabled transitions 200, a list of currently activated breakpoints 210 (none in the example) and a history list 220. The list of enabled transitions 200 indicates to the user which transitions can be executed next in order to continue the simulation. In this particular case, the last transition on the list 230 is highlighted and its execution is now being simulated. The history list 220 shows the sequence of transitions that have already been executed during the simulation.

A simulation menu bar 240 is also shown. In this embodiment, the available options include go-to-next-state of simulation 250, go-to-previous-state of simulation 260, jump-back in history list 270, jump-to-beginning of history list 280, execute-until-breakpoint 290, set-breakpoint 300 and clear-breakpoint 310. The simulator's pull-down File 320 and Help 330 menus are also depicted.

In this embodiment, the lower left panel of FIG. 2 is a process viewer tool 340 for VPL specifications. This enables a user to scroll up or down through the VPL source code of a specification. In the illustrated case, lines 113 through 135 350 of the VPL source code for a LAN node (node number 0) executing the Rether protocol are depicted. Lines 121 360 and 126 370 are highlighted by the simulator to indicate that the execution of the command release!*in line 125 380 is being simulated.

The lower right panel 390 is a process viewer tool for GCCS processes. It enables a user to pan through a GCCS graphical process specification. In the illustrated case, the GCCS specification of the Rether protocol's admissions control process 140 is shown. The admissions control process has nine control states and 12 transitions linking control states. State ready 400 is the start state.

Transitions are labeled by the actions that are executed when the transition is taken. In the current example, the simulator is simulating the execution of the release transition 410 from state ready 400 to state read2 420, as indicated by the small control-flow token 430 traveling along this transition. The execution of the release transition 410 along with the execution of the release!* command 380 in the VPL source code of node number 0 350, allows the simulator to convey to the user that a communication is taking place between admissions control 140 and node 0 160 so that node 0 160 may release its bandwidth reservation. The communication link along which this communication occurs is bus4 170.

All specifications created by a user of the invention, including the Rether specifications given in FIG. 2 130, 340, 390, are equipped with a formal semantics enabling the invention to conduct mathematically based verification and analysis on system designs. In particular, designs are translated into hierarchically structured labeled transition systems using the technique of operational semantics. Labeled transition systems are stored internally by the system in an object-oriented manner, and are accessible to the other modules of the invention for simulation, verification, code-generation and other purposes.

FIG. 3 contains the pseudo-code of the invention's local model checker for the modal mu-calculus. The input parameters to the algorithm are a network N 440 and a modal mu-calculus form "$X_0$ in B" 450. The algorithm checks if the network 440 satisfies the formula 450 by constructing, in an on-the-fly fashion, a dependency graph whose nodes are of the form <s,X> 460 where s is a state of the given network 440 and X is a subformula of the given formula 450. The rules for constructing the dependency graph are invoked at line 11 470. Also at line 11 470, the successors of v, the currently visited node of the vertex table, are examined one after the other in, say, left-to-right order, so that each cell returns the left-most successor that has not yet been examined. Null is returned when all successors have been examined. "EL/CKS" at line 16 480, represents a call to the Emerson-Lei or Cleaveland-Klien-Steffen global iterative model checking algorithms.

FIG. 4 contains the rules invoked by the invention's local model checker in order to construct the dependency graph in an on-the-fly or depth-first-search manner. There are four rules, one each for logical conjunction 490, logical disjunction 500, the box-a modality 510 and the diamond-a modality 520. Each of these logical operators are operators of the modal mu-calculus. Each rule contains a single dependency graph vertex on top 530 and two or more dependency graph vertices on the bottom 540. The intended meaning of a rule is that the logical valuation of the vertex on the top 530 is determined by or is dependent on the logical valuations of the vertices on the bottom 540.

The invention's local model checker also supports partial-order reduction during the checking of modal mu-calculus formulas. As described in FIG. 5, the pseudo-code for the local model checker with partial-order reduction is obtained by modifying the pseudo-code of FIG. 4. The modification to line 0 550 accounts for the fact that the invention's partial-order reduction technique uses a dialect of the modal mu-calculus known as the weak modal mu-calculus. The modifications to line 11 560 essentially amount to performing the independence check, which, in turn, eliminates redundant system states and transitions from consideration.

FIG. 6 presents a variety of performance statistics that illustrate the effects of the invention's partial-order reduction technique. Data is given for four types of modal mu-calculus formulas: DFS (depth first search) 570, LFP (least fixed point) 580, NST (nested fixed points) 590, and GFP (greatest fixed point) 600. Also, data is given for two benchmarking programs: leader 610 which is a leader election protocol for distributed systems, and sieve 620, which is the primality testing system known as the sieve of Eratosthenes. For each program, the number of vertices in the constructed dependency graph 630 and the total memory usage (in Mega Bytes) 640 is given, first without partial-order reduction 650, and then with partial-order reduction 660.

What is claimed is:

1. A method of designing software for a concurrent system comprising:
    specifying software in a design language possessing a formal semantics;
    simulating the design in accordance with its formal semantics;
    verifying that the design satisfies predetermined requirements;
    generating test cases and;
    generating software code.
2. A method as in claim 1 wherein:
    the verification includes using partial-order reduction algorithms to reduce the state space.
3. A method as in claim 1 wherein:
    the specification is composed using a graphical editor and a textual editor.
4. A method as in claim 3 wherein:
    the graphical and textual editors perform static type checking to insure that correct values are communicated in all contexts.
5. A method as in claim 3 wherein:
    the graphical and textual editors are structure-based editors that insure that all specifications produced using these editors are syntactically correct.
6. A method as in claim 1 wherein:
    the design language is a graphical coordination language permitting subsystems specified in different design notations to be combined together.
7. A method as in claim 1 wherein:
    the design language provides constructs that allow communication ports of different, independent subsystems to be connected, thereby introducing a capability for exchange of data values among the subsystems.
8. A method as in claim 1 wherein:
    the design language provides constructs that allow the communication ports of a subsystem to selectively be removed from or added to the subsystem's communication interface.
9. A method as in claim 1 wherein:
    the design language supports hierarchical specifications in which a system is composed of subsystems and sub-systems are composed of sub-subsystems.
10. A method as in claim 1 wherein:
    the design specification supports open notation allowing for the simulation and verification of subsystems independently of other subsystems.

11. A method as in claim 1 wherein:
the simulation can simulate different levels of the hierarchy simultaneously.

12. A method as in claim 1 wherein:
the simulation allows for commands to stop upon satisfaction of a predetermined condition.

13. A method as in claim 1 further comprising:
providing a history list that documents the simulation.

14. A method as in claim 13 wherein:
the simulation may be stopped and restarted at any point on the history list.

15. A method as in claim 1 wherein:
the verification is accomplished by model checking.

16. A method as in claim 15 wherein:
the model checker can verify possibility properties.

17. A method as in claim 15 wherein:
the model checker can check hierarchical networks.

18. A method as in claim 15 wherein:
the model checker uses partial-order reduction methods.

19. A method as in claim 18 wherein:
the partial-order reduction methods use dynamic information regarding the behavior of the specification to determine which states and transitions can be eliminated from consideration.

20. A method as in claim 15 wherein:
the model checker allows for the independent verification of subsystems and the ability to verify hierarchical systems.

21. A method as in claim 1 wherein:
the verification checks for the predetermined condition of equivalence.

22. A method as in claim 1 wherein:
the verification uses minimization to eliminate redundant states from the state space underlying a system specification.

23. A method as in claim 1 wherein:
the verification checks for the predetermined condition of preordering.

24. A method of using a computer for specifying and verifying a concurrent system comprising:
inputting by a graphical editor and a textual editor a formal design of the software;
inputting desired properties as formulas in temporal logic;
verifying automatically if the formal design satisfies the desired properties.

25. A method of using a computer as in claim 24 wherein:
the graphical and textual editors allow for specifying hierarchically structured systems which are composed of subsystems.

26. A method of using a computer as in claim 25 wherein:
the specification created by the graphical and textual editors has formal operational semantics.

27. A method of using a computer as in claim 24 wherein:
the graphical and textual editors perform static type checking to insure that correct values are communicated in all contexts.

28. A method of using a computer as in claim 24 wherein:
the graphical and textual editors are structure-based editors that insure that all specifications produced using these editors are syntactically correct.

29. A method of using a computer as in claim 24 wherein:
the formal design supports the specification of open systems.

30. A method of using a computer as in claim 24 wherein:
one desired property that is verified is a condition of equivalence.

31. A method of using a computer as in claim 24 wherein:
one desired property that is verified is a condition of preordering.

32. A method of using a computer as in claim 24 wherein:
one desired property that is verified is a condition of freedom from deadlock.

33. A method of using a computer as in claim 24 wherein:
one desired property that is verified is a condition of a possibility property.

34. A method of using a computer as in claim 24 further comprising:
using partial-order reduction methods to eliminate redundant portions of the state space from consideration.

35. A method of using a computer as in claim 34 wherein:
the partial-order reduction methods include using dynamic information regarding the behavior of the specification to determine which states and transactions can be eliminated from the verification.

36. A method of using a computer as in claim 24 wherein:
the verification is done in a local, demand-driven manner.

37. A method of using a computer as in claim 24 wherein:
verification allows for independent verification of subsystems and an ability to verify hierarchical systems.

38. A method of using a computer as in claim 24 further comprising:
simulating the design in accordance with its formal semantics.

39. A method of using a computer as in claim 38 wherein:
the simulation can simulate different levels of the hierarchy simultaneously.

40. A method of using a computer as in claim 18 wherein:
the simulation allows for commands to stop upon satisfaction of a predetermined condition.

41. A method of using a computer as in claim 18 further comprising:
producing a history list that documents the simulation.

42. A method of using a computer as in claim 41 wherein:
the simulation may be stopped and restarted at any point on the history list.

43. A method of using a computer as in claim 24 further comprising:
generating implementation code from the formal design.

44. Computer software for specifying and verifying concurrent systems comprising:
a graphical editor for specifying a system;
a textual editor for specifying a system;
means for verifying the specification for preselected properties.

45. Software as in claim 44 wherein:
the graphical and textual editors allow for specifying hierarchically structured systems.

46. Software as in claim 44 wherein:
the specifications produced using the graphical and textual editors have formal operational semantics.

47. Software as in claim 44 wherein:
the graphical and textual editors perform static type checking to insure that correct values are communicated in all contexts.

48. Software as in claim 44 wherein:
the graphical and textual editors are structure-based editors that insure that all specifications produced using these editors are syntactically correct.

49. Software as in claim 44 wherein:

open systems can be specified.

50. Software as in claim 44 wherein:

one preselected property is a condition of equivalence.

51. Software as in claim 44 wherein:

one preselected property is a condition of preordering.

52. Software as in claim 44 wherein:

one preselected property is a condition of freedom from deadlock.

53. Software as in claim 44 wherein:

one preselected property is a condition of possibility properties.

54. Software as in claim 44 further comprising:

means for partial-order reduction.

55. Software as in claim 54 wherein:

the means for partial-order reduction includes using dynamic information regarding the behavior of the specification to determine which states and transitions can be eliminated from the verification.

56. Software as in claim 44 wherein:

the verification is done in a local, demand-driven manner.

57. Software as in claim 44 wherein:

the verification allows for independent verification of subsystems and an ability to verify hierarchical systems.

58. Software as in claim 44 further comprising:

an implementation code generator for generating executable code from the specification.

59. Software as in claim 44 further comprising:

a simulator for simulating the system in accordance with its specification.

60. Software as in claim 59 wherein:

the simulator can simultaneously simulate different levels of a hierarchical system.

61. Software as in claim 60 wherein:

the simulation may be stopped and restarted at any point on the history list.

62. Software as in claim 59 wherein:

the simulator stops upon satisfaction of a predetermined condition.

63. Software as in claim 59 further comprising:

a history list that documents the simulation.

* * * * *